United States Patent [19]

Motola et al.

[11] 4,165,492
[45] Aug. 21, 1979

[54] RECIRCULATION CIRCUIT FOR REPETITION OF AN ANALOG PULSE SIGNAL

[75] Inventors: Marcel Motola; Yves Besson, both of Paris, France

[73] Assignee: Thomson-CSF, Paris, France

[21] Appl. No.: 884,213

[22] Filed: Mar. 7, 1978

[30] Foreign Application Priority Data

Mar. 11, 1977 [FR] France ................................ 77 07332

[51] Int. Cl.² .................. H03B 1/04; G11B 13/00
[52] U.S. Cl. .................................... 328/165; 328/55; 365/73
[58] Field of Search ............. 328/55, 165, 127; 330/149, 105, 109; 365/73, 76

[56] References Cited

U.S. PATENT DOCUMENTS 3,201,705  2/1965  Hanalec et al. ............... 328/165
3,537,077  10/1970  Gerig ............................ 365/73

Primary Examiner—Stanley D. Miller, Jr.
Assistant Examiner—B. P. Davis
Attorney, Agent, or Firm—Cushman, Darby & Cushman

[57] ABSTRACT

A recirculation circuit for repetition of an analog pulse signal provided with a return loop from an output divider and with an input adder for reinjecting the signal into a delay circuit connected between the adder and divider. An active circuit having a nonlinear gain characteristic is further inserted in the loop for producing a loop gain which is less than or greater than unity according as the amplitude of the signal is lower than or higher than a predetermined threshold value. So as to substantially attenuate the parasitic signals. The recirculation circuit may be further provided with a limiter circuit for delivering the repeated signal at constant amplitude.

4 Claims, 9 Drawing Figures

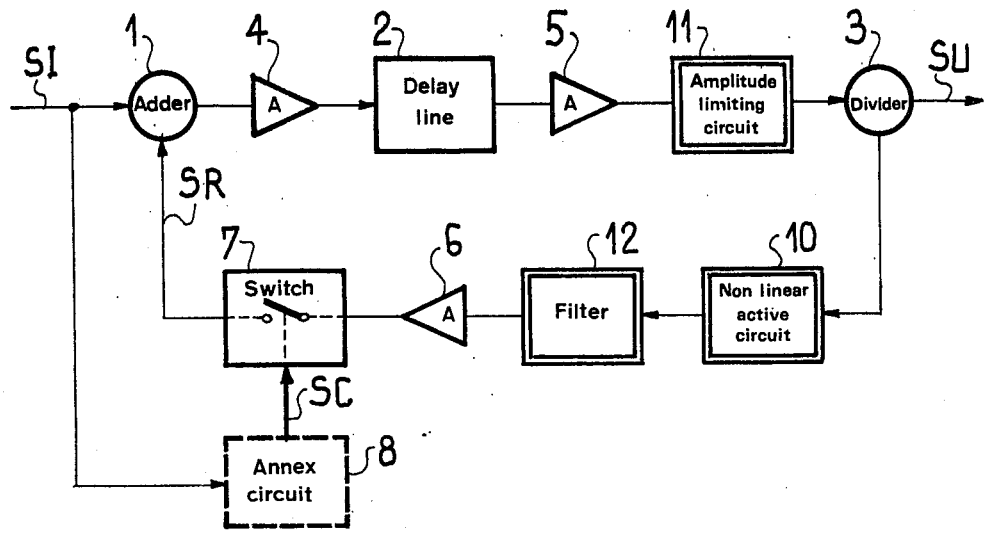
Fig_1
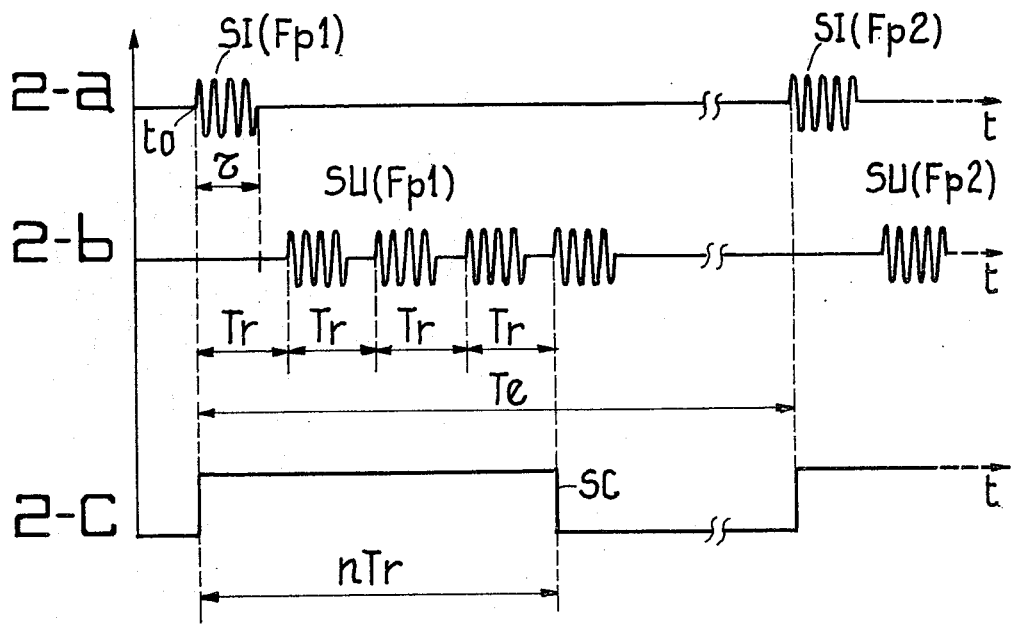
Fig_2

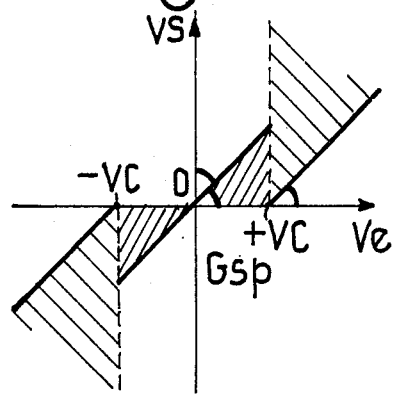
Fig_3
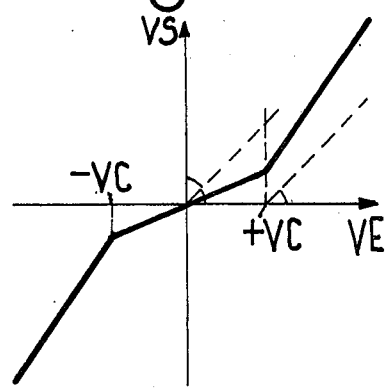
Fig_4
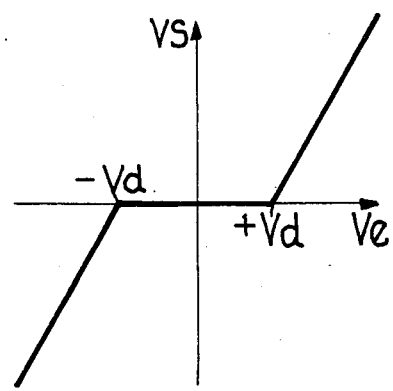
Fig_5a
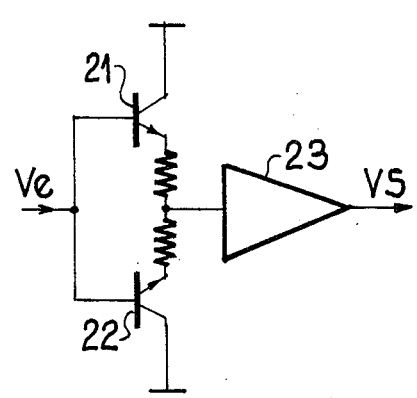
Fig_5b
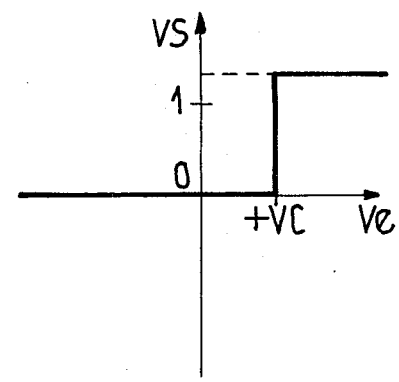
Fig_6a
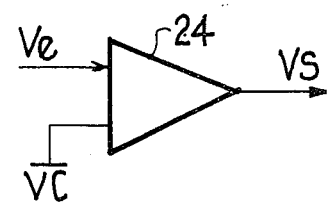
Fig_6b

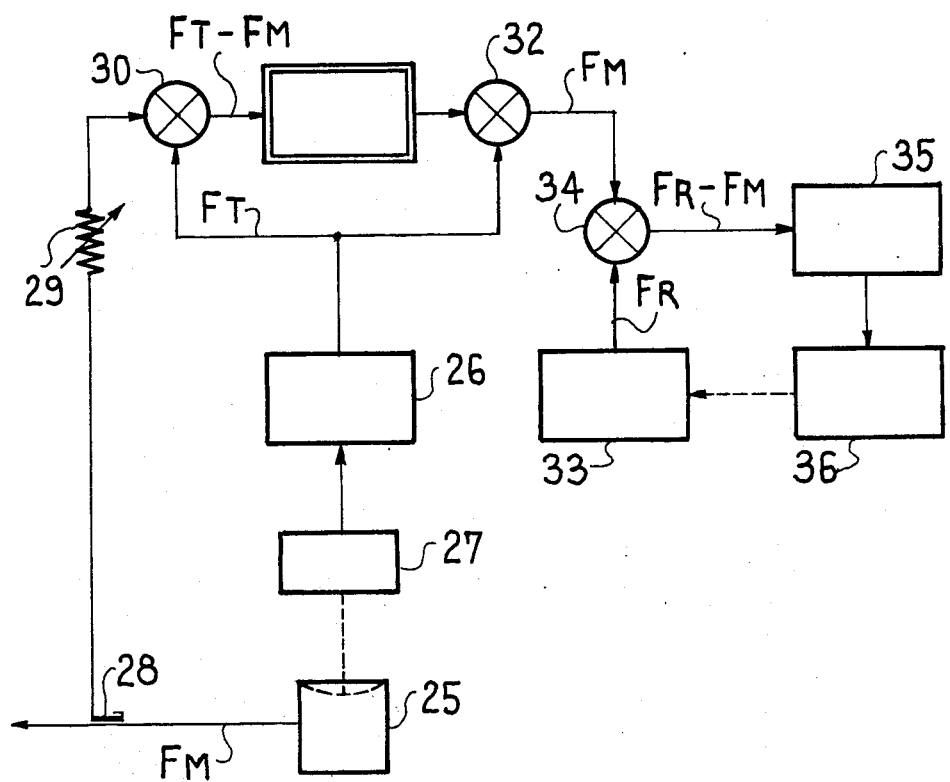
Fig_7

RECIRCULATION CIRCUIT FOR REPETITION OF AN ANALOG PULSE SIGNAL

The present invention relates to a recirculation circuit for the repetition of an analog pulse signal.

The invention is applicable in the case where it is necessary to effect or complete the processing of a deferred signal after the information has disappeared. This occurs when the signals are short, for example in the case of radar pulses.

An application which is more particularly envisaged for the invention is in the field of radars having a frequency agility, that is to say those in which the frequency varies from one pulse to the other and where it is found necessary to conserve the frequency information a sufficiently long period of time which may distinctly exceed that of the transmitted pulse.

A circuit according to the invention permits the construction of a frequency memory. Frequency memory is intended to mean the function of reproducing at the output n copies evenly spaced apart with respect to time of a radio-frequency pulse presented at the input. The circuit thus permits the storage of fugitive pulses and the deferred processing of the signal after the disappearance of the original information.

A frequency memory circuit generally comprises in the known manner a loop with a delay line. The loop circuit ensures the recirculation of a pulse originally applied to the input in the following manner: the information is delayed in the delay element, a fraction of the delayed signal is taken off at the output and reinjected at the input of the delay line and so on.

The major drawback of any loop system, particularly when it operates at high frequencies is that there is always a risk of unwanted self oscillations if the gain of the loop is higher than unity and the loop phase is imperfectly controlled.

When the gain is higher that unity, the origin of the unwanted oscillations which adversely effect the normal operation of the circuit always occurs on the noise. The latter includes not only the thermal noise present in any electric circuit but also parasitic signals produced by the delay line at instants different from that of the output of the delayed useful signal. These parasitic signals follow the same path as the useful signal. The noise is ceaselessly amplified in the loop and consequently finally transformed into oscillations when its amplitude is limited by a nonlinearity of a component of the loop.

In order to overcome this type of difficulty in loop circuits, the loop gain is chosen to be lower than unity. This has for result to decrease the amplitude of the duplicated signals with a rapidity which increases with the difference between the gain of the loop and the unity gain.

It is then understandable that the compromise on the gain of the loop is difficult since, in order to avoid having reproduced signals the amplitude of which is not excessively descreased, the gain of the loop must be close to but less than unity. Under these conditions of operation, a very small variation of a parameter occuring in the determination of the value of the loop gain can bring the circuit into an instability zone and produce the aforementioned unwanted oscillations.

An object of the present invention is to provide a recirculation circuit which overcomes the aforementioned drawbacks of instability, decrease in amplitude and self-oscillations.

According to a feature of the invention the recirculation circuit comprises, in addition in the loop, an active circuit having a nonlinear gain characteristic so that the gain is less than unity for signals of an amplitude less than a threshold value and greater than unity for signals of amplitude higher than said threshold value, the latter being determined in relation to the amplitude of the useful signal to be repeated and of the signal-to-noise ratio presented at the input so as to substantially attenuate the parasitic signals of the noise, and an amplitude-limiting circuit for repeating the signal at a constant amplitude.

The features and advantages of the invention will be apparent from the ensuing description given by way of example with reference to the accompanying Figures in which:

FIG. 1 represents a simplified diagram of a recirculation circuit according to the invention;

FIG. 2 represents the waveforms relating to the operation of the circuit of FIG. 1;

FIG. 3 is a diagram of the gain characteristics relating to the loop circuit of FIG. 1;

FIG. 4 represents a response curve form which may be envisaged for the nonlinear active circuit incorporated in the loop according to the invention;

FIGS. 5a and 5b represent respectively the response curve and a first embodiment of the nonlinear active circuit;

FIGS. 6a and 6b represent respectively the response curve and a second embodiment of the nonlinear active circuit;

FIG. 7 represents a diagram relating to the application to a radar having frequency agility for achieving locking test or for clenching the automatic frequency control circuit.

With reference to FIG. 1, the recirculation circuit comprises in a conventional manner, a loop formed by the following elements. At the input, an adder circuit 1 receives through a first input the signal SI to be reproduced and through a second input the loop signal SR to be reinjected. The adder circuit 1 is followed by a delay line 2 the delay Tr of which exceeds the duration $\tau$ of the pulse signal SI to be repeated and the frequency characteristics of which are chosen in consequence. Thus, if the center frequency Fe of the signal is liable to be within a frequency band B centered on a central frequency of operation Fo, the delay line 2 is arranged to process signals corresponding to these frequency characteristics.

A divider circuit 3 is then placed at the output for taking off a fraction of the delay signal and transmitting it through the loop and through the second input of the adder 1 to the delay line 2, and so on.

The loop circuit further comprises amplifying means which may comprise, as shown, a first linear amplifier 4 between the adder 1 and the delay line 2, a second linear amplifier 5 between the output of the delay line and the divider 3 and a third linear amplifier 6 in the loop connection between the divider and the adder. Also inserted, as shown, in this connection is a switching device 7 which closes the loop for a period corresponding to the number n of recirculations to be produced. In the case where the pulse signals to be stored are recurrent, at a period designated by Te, the duration of the closure of the switch must be made less than this period Te, which implies a maximum number Te/Tr of possible repetitions.

A radio-frequency pulse SI to be stored, represented symbolically in FIG. 2a, is considered to be present at the input of the adder at a considered instant, the pulse passes through the adder circuit 1, the amplifier 4 and enters the delays line 2 and issues from the latter at the subsequent instant to+Tr. After amplification at 5, the pulse is split up and sent by the divider 3, on one hand, to the output and, on the other hand to the loop connection where it is amplified at 6 and sent through the closed switch 7 again to the input adder 1. The signal SR is thus reinjected for a new cycle which proceeds in exactly the same way as that just described. FIG. 2b represents the useful signal SU received at the output for a number n=4 recirculations and in the concept of a periodic signal SI. FIG. 2c represents the control signal SC applied to the switch circuit 7. This signal is considered to be produced by an annex circuit 8 in which there is detected the initial instant to, which may be given by a transmission synchronization clock, and where the control rectangular pulse SC having the desired duration is produced.

According to the invention, the recirculation circuit further comprises, inserted in the loop, an active circuit 10 consisting of one or more elements and having a nonlinear gain characteristic so that the loop gain is less than or greater than 1, depending on the amplitude of the signals relative to a given threshold value, in such manner as to attenuate the parasitic noise signals and preserve the signal-to-noise ratio.

The property of the active circuit 10 is revealed by FIGS. 3 and 4 in which the abscissa axis corresponds to the amplitude of the input signal Ve and the ordinate axis corresponds to the output amplitude Vs of this circuit. Bearing in mind the alternating nature of the signal, the threshold value is represented by the values +Vc and −Vc. FIG. 3 shows the slope corresponding to the gain 1 and the crosshatched zones which are those in which the gain curve of the active circuit 10 must be located. A possible response curve for the circuit is shown in FIG. 4 by way of example. In respect of signals whose amplitude is lower than the threshold value Vc and therefore between −Vc and +Vc, the circuit produces a gain Gsp between 0 and 1 so that the loop gain is lower than 1. In respect of signals whose amplitude is higher than the threshold value Vc, that is to say outside the range −Vc to +Vc, the gain Gsu produced by the circuit 10 is such that the loop gain is higher than 1.

The threshold value Vc is determined in accordance with the amplitude of the useful signal to be reproduced and the signal-to-noise presented at the input. This ratio is usually known and in a consequence the range determined by the threshold value encompasses the parasitic noise signals which are attenuated in the loop and there is no danger under these conditions of their producing unwanted oscillations. Note that the gain Gsu produced for the useful signal may be chosen with a wide tolerance, the condition to be respected being a gain higher than 1 beyond the fixed threshold value so as to avoid the drawback of a progressive decrease of the useful signal.

It is also arranged to add in the loop or outside the loop, at the output, an amplitude limiting circuit 11 without which the useful output signals would have their amplitude increasing as a function of their output order. In this way there is obtained a repetition of the signal with a constant amplitude at the output (FIG. 2b). There is also provided a filter circuit 12 having the frequency characteristic of the incident signal to be processed, that is to say a band pass B and a central frequency Fo, to filter the harmonic of the carrier frequency Fp of the signal. These harmonics are created by the nonlinear characteristic of the active circuit 10.

FIGS. 5 and 6 show different types of nonlinear circuits which may satisfy the required characteristics for the operation as explained hereinbefore.

The circuit shown in FIG. 5b comprises a push-pull circuit with two complementary C class biased transistors 21 and 22 followed by a linear amplifier 23. FIG. 5a represents the corresponding response curve, the threshold voltage corresponds to the residual voltage Ve of the transistors 21 and 22.

The second embodiment shown in FIG. 6b employs a comparator circuit 24 and the response curve indicated in FIG. 6a shows that only amplitudes higher than Vc are transmitted with a constant gain, the gain being zero below the threshold value. It is possible to manage a more complex circuit to effect a double comparison and obtain a symmetrical response curve.

FIG. 7 relates to an application to a radar having an agile frequency which may be of the type disclosed in U.S. Pat. No. 3,996,588, Dec. 7, 1976. In such radar systems a fixed frequency is achieved by the prepositioning of a local transfer oscillator and the automatic frequency control circuit or AFC employs the local transfer oscillator and the local radar oscillator. The frequency of the magnetron, increased by the intermediate frequency, is compared with that of the local transfer oscillator in a frequency discriminating measuring circuit. A second comparison is effected between the local transfer oscillator and the local radar oscillator, these measurements being to be equalised when locking. In the diagram of FIG. 7 there has been shown at 25 an adjustable-frequency magnetron and at 26 a local transfer oscillator of the type of oscillator controlled by voltage. A circuit 27 translates the frequency variations of the magnetron 25 into an electric signal which consequently permits the control of the frequency of the local transfer oscillator 26. A fraction of the pulse transmitted at the frequency FM is taken off by a detector 28 followed by an attenuator 29 and is transposed in frequency in a mixer 30 which receives the frequency FT of the local oscillator 26. The transposed signal obtained at the output having the frequency FT-FM may be for example within a band between 100 and 140 MHz and is applied to a recirculation circuit 31 of the type described before. The repeated pulses received at the output are at the corresponding frequency Fp of the input pulse (FIGS. 2a and 2b) and local wave FT, then the signal is mixed with the local frequency FR of the radar oscillator 33 in a mixer 34. The output of the latter mixer is applied to a measurement discriminator 35 to produce an AFC test or to proceed to a clenching by successive adjustments of the AFC. In the case of an AFC locking test, the circuit 36 may be for example constituted by an indicator light; in the case of an AFC clenching the circuit 36 produces from the error signal at the output of the discriminator 35 a signal controlling the frequency of the local radar oscillator 33.

Among the other possible applications of the recirculation circuit there may be envisaged, in particular, received frequency identification, in the counter-measure field, or inversely the creation of echoes in the jamming field.

An embodiment of the invention has satisfied the following characteristics:

frequency memory between 100 and 140 MHz;
store radio-frequency pulse of width 0.4 to 1.2 μs, number of recirculations n=10;
elastic surface wave delay line having a delay of 10 μs;
nonlinear active circuits of the type diagrammatically shown in FIG. 6 by means of an extra-rapid solid-state circuit comparator ("Advanced Micro Devices" Am 685). The value of the threshold voltage has been in particular adjusted so that all the parasitic echoes that the delay line produces are eliminated each time.

What is claimed is:

1. A recirculation circuit for the repetition of an analog pulse signal of the type comprising a loop formed by
    a delay circuit for producing a delay at least equal to the duration of the signal, and
    a divider and an adder circuit respectively in connection with the output and input of said delay circuit for respectively taking off a fraction of said delayed signal and re-inserting it in the input of said delay circuit by means of said adder circuit, and
    amplifying means having linear characteristic inserted in said loop for producing a predetermined loop gain and switch means for closing said loop during a predetermined time corresponding to the envisaged number of repetition, said loop further comprising,
    an active circuit having a nonlinear gain characteristics such that the gain is less than unity for signals of amplitude lower than a threshold value and higher than unity for signals of amplitude higher than said threshold value, said nonlinear active circuit having a linear response curve in amplitude within the range of the useful signals, that is to say outside that defined by said threshold value, the latter being determined in relation with the amplitude of the useful signal to be repeated and of the signal to noise ratio presented by said input signal so as to substantially attenuate the parasitic noise signals, and
    an amplitude limiting circuit for repeating said signal with a constant amplitude.

2. A recirculation circuit for the repetition of an analog pulse signal of the type comprising a loop formed by
    a delay circuit for producing a delay at least equal to the duration of the signal, and
    a divider and an adder circuit respectively in connection with the output and input of said delay circuit for respectively taking off a fraction of said delayed signal and re-inserting it in the input of said delay circuit by means of said adder circuit, and
    amplifying means having linear characteristic inserted in said loop for producing a predetermined loop gain and switch means for closing said loop during a predetermined time corresponding to the envisaged number of repetition, said loop further comprising,
    an active circuit having a nonlinear gain characteristic such that the gain is less than unity for signals of amplitude lower than a threshold value and higher than unity for signals of amplitude higher than said threshold value, said nonlinear active circuit having a linear response curve in amplitude within the range of the useful signals, that is to say outside that defined by said threshold value, the latter being determined in relation with the amplitude of the useful signal to be repeated and of the signal to noise ratio presented by said input signal so as to substantially attenuate the parasitic noise signals, and
    an amplitude limiting circuit for repeating said signal with a constant amplitude, said loop further comprising
    a filter circuit for eliminating the harmonics of the useful signal created by the non linearity of said non linear active circuit, said filter having a band pass corresponding to that of the expected signals.

3. A recirculation circuit as claimed in claim 2, wherein the active circuit having a nonlinear gain characteristic comprises a push-pull circuit having two complementary C class biased transistors followed by a linear amplifier.

4. A recirculation circuit as claimed in claim 2, wherein the active circuit having a nonlinear gain is formed by an extra-rapid comparator.

* * * * *